June 8, 1965  JAMES E. WEBB  3,187,583
ADMINISTRATOR OF THE NATIONAL AERONAUTICS
AND SPACE ADMINISTRATION
SPACE SIMULATOR Filed Nov. 9, 1961  4 Sheets-Sheet 4

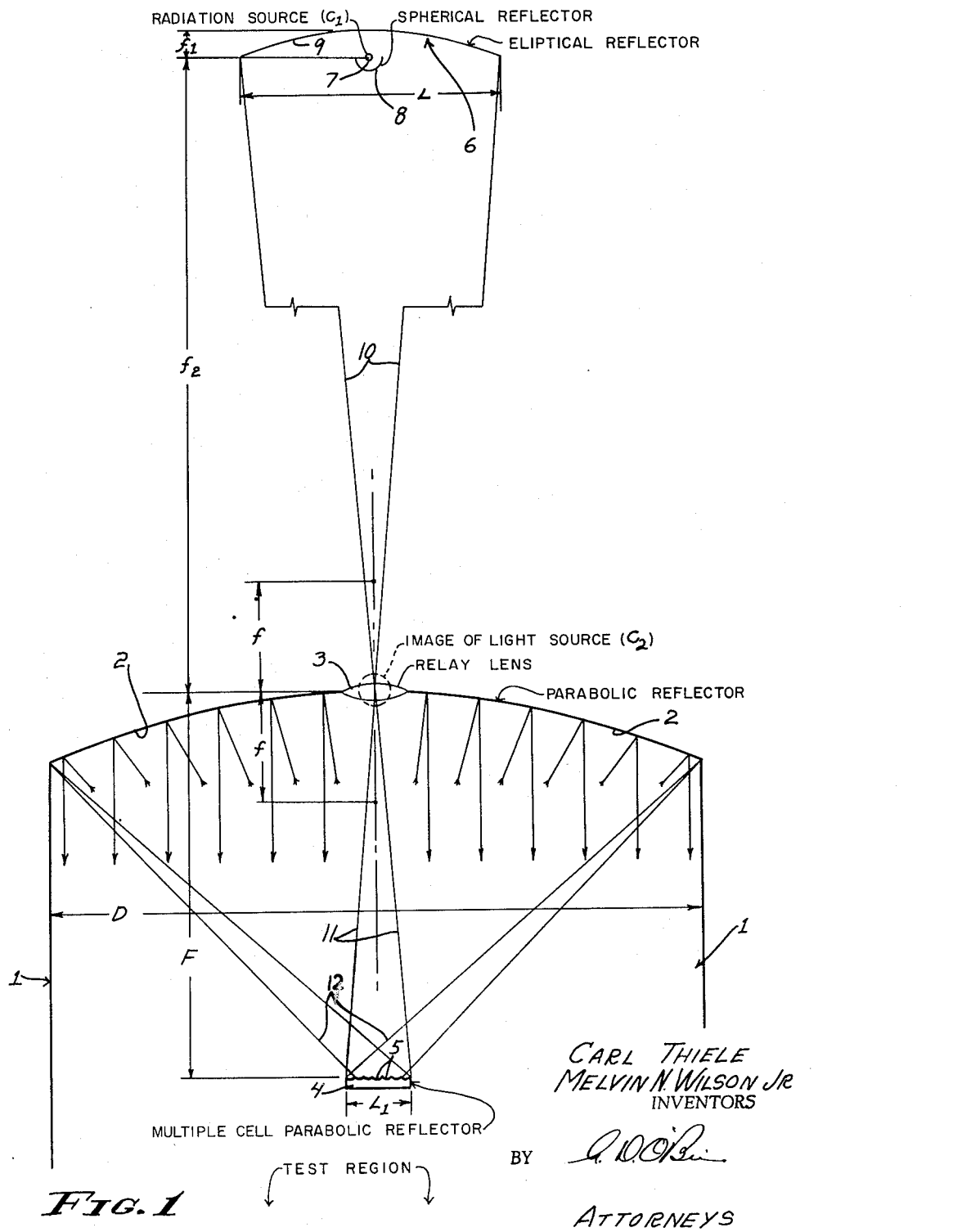

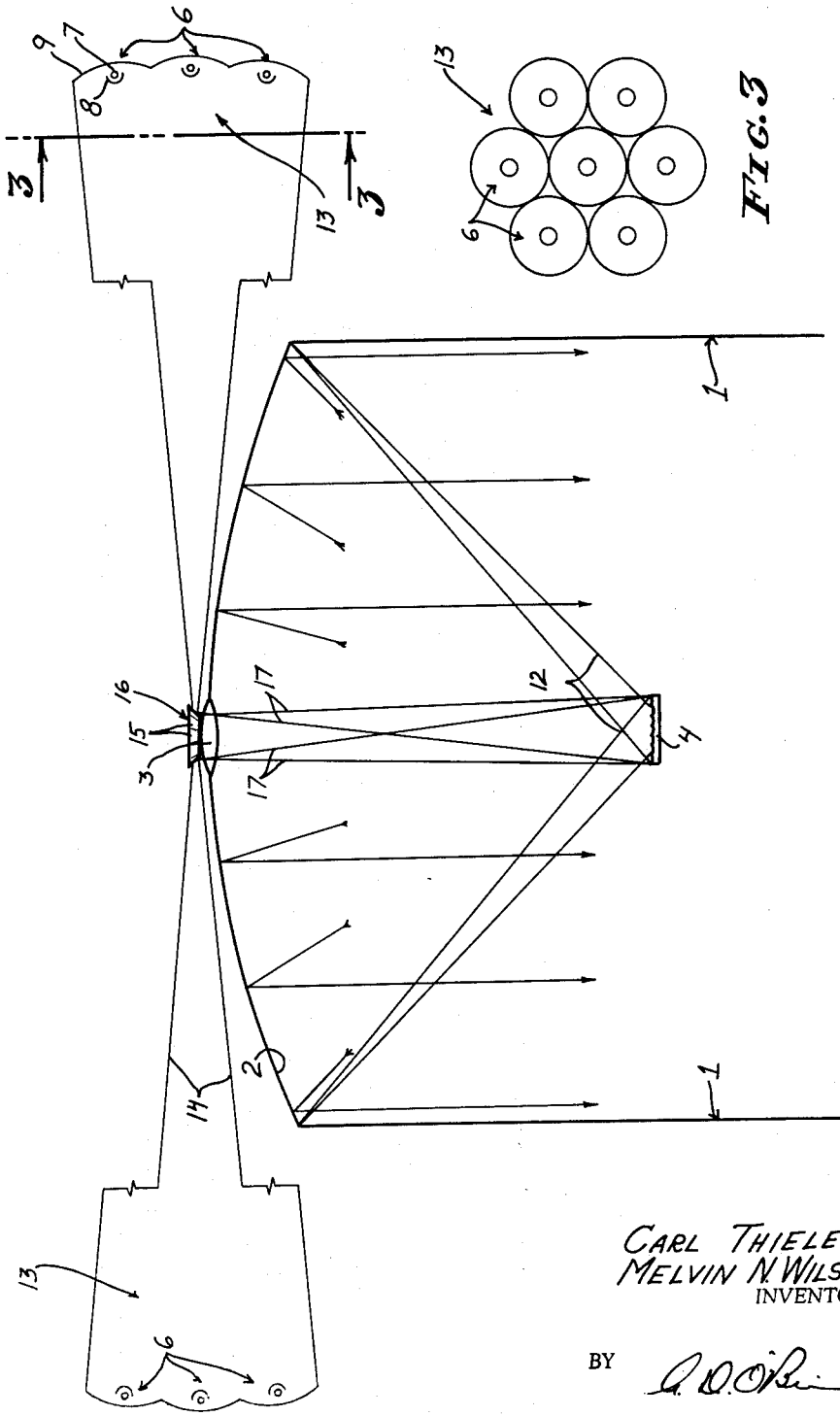

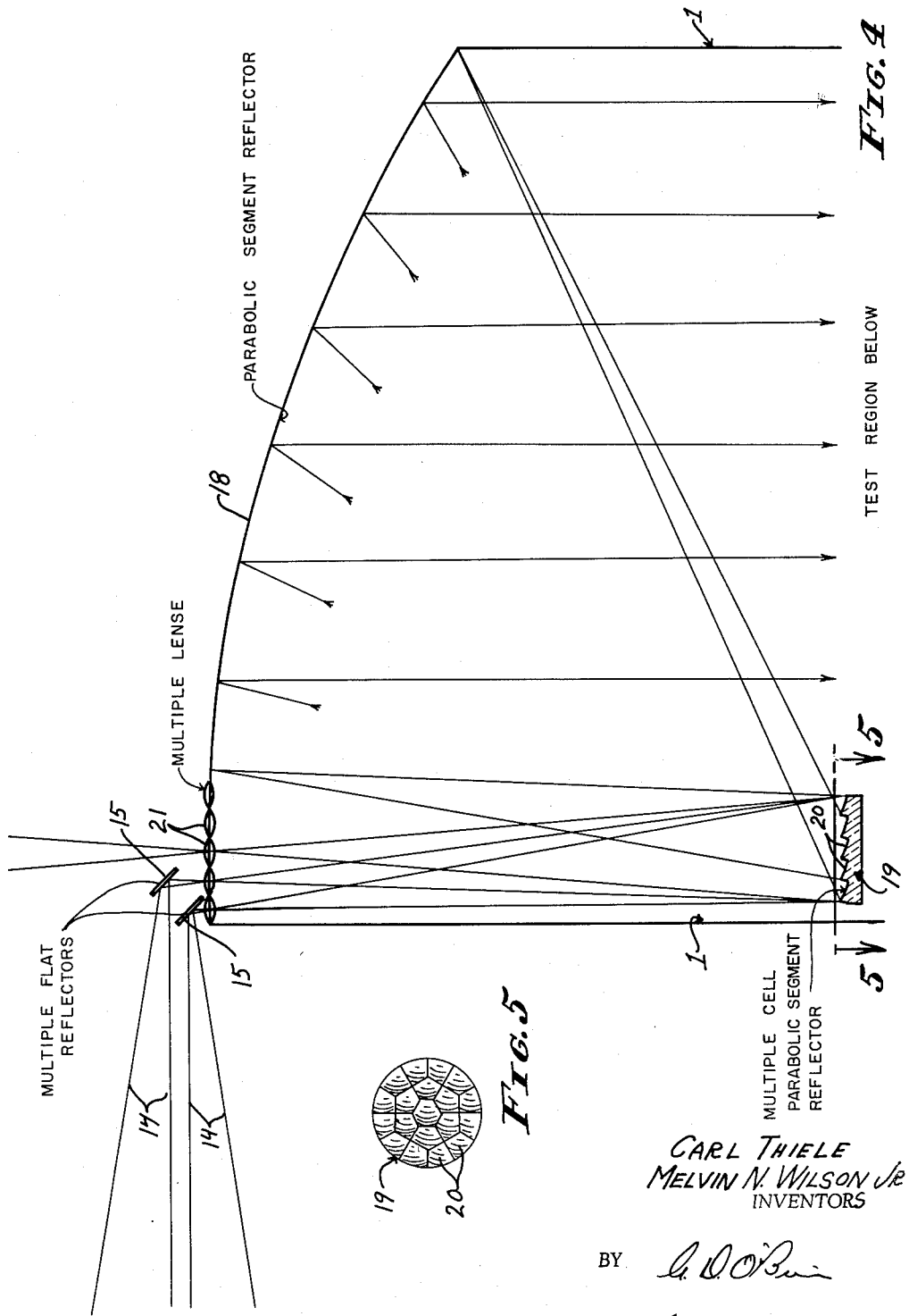

CARL THIELE
MELVIN N. WILSON JR
INVENTORS

BY G. D. O'Brien

ATTORNEYS

3,187,583
SPACE SIMULATOR
James E. Webb, administrator of the National Aeronautics and Space Administration, with respect to an invention of Melvin N. Wilson, Jr., and Carl Thiele
Filed Nov. 9, 1961, Ser. No. 180,384
12 Claims. (Cl. 73—432)

This invention relates to space simulators; that is, to apparatus adapted to simulate conditions approaching absolute zero temperature and pressure in the presence of a high level of solar radiation.

Included in the objects of this invention are:

First, to provide a space simulator in which a test chamber dimensioned to receive a model of a space vehicle is maintained under conditions of high vacuum and low temperature while the model is subjected to radiations approximating intensities and wave lengths of solar radiations.

Second, to provide a space simulator which incorporates a novel optical system arranged to transmit radiations of appropriate wave length from a plurality of sources externally of the test chamber, through a wall of the test chamber in such a manner as to effect substantially uniform distribution throughout the test region.

Third, to provide a space simulator which utilizes a parabolic main reflector substantially coextensive with one end of the test chamber, and a mating multiple cell reflector within the test chamber, the multiple cell reflector being so related to the external optical system that the sum of the radiations from the radiation sources are distributed over the multiple cell reflector, and each cell thereof reflects the radiations which it receives over essentially the entire surface of the main reflector so that the radiations received at any point on the main reflector are the sum of the reflections from all the cells of the multiple cell reflector; whereby the radiations transmitted by the main reflector tend to be uniform.

Fourth, to provide a space simulator which is particularly adapted to produce radiations simulating the high intensity solar radiations believed to exist in the region of the planet Venus.

With the above and other objects in view, as may appear hereinafter, reference is directed to the accompanying drawings in which:

FIGURE 1 is a diagrammatical view of the space simulator showing particularly the optical or radiation transmitting system in its simpler form utilizing a single source of radiation;

FIGURE 2 is another diagrammatical view thereof showing particularly the optical or radiation transmission system as arranged for multiple source of radiation;

FIGURE 3 is a diagrammatical view taken in plane 3—3 of FIGURE 2 showing one of the radiation units;

FIGURE 4 is another diagrammatical view showing a further modification of the optical or radiation system;

FIGURE 5 is a plan view of the multiple cell reflector taken from the plane 5—5 of FIGURE 4;

Figure 6:
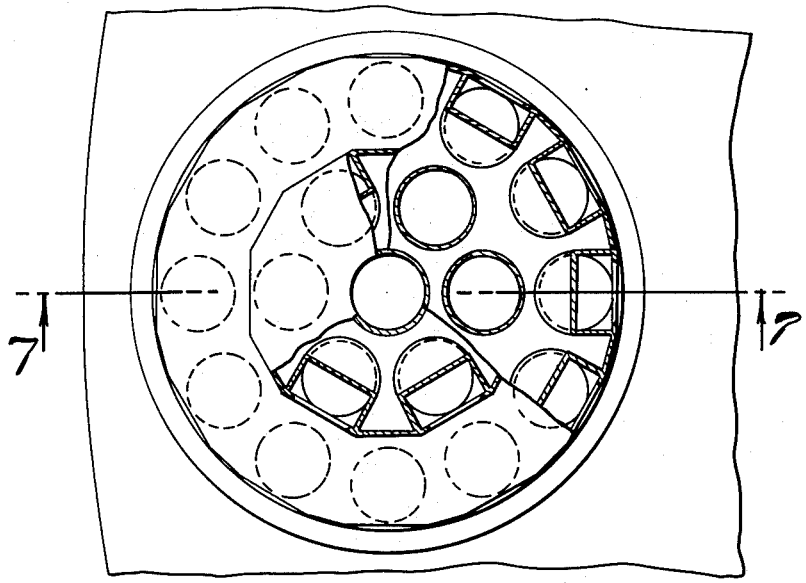
FIGURE 6 is a fragmentary top view of the space simulator shown in FIGURE 4 with portions in section taken approximately along line 6—6 of FIGURE 7.

Reference is first directed to FIGURE 1. The space simulator includes a test chamber structure 1, which will be described in more detail hereinafter. The test chamber structure consists essentially of an enclosing shell which is so constructed that a high vacuum may be maintained therein, and which incorporates means whereby its walls may be maintained at a temperature near absolute zero. At one end, the test chamber structure is provided with a main parabolic reflector 2. Centered within the reflector 2 is a relay lens 3.

Suitably supported within the test chamber structure in the region of the focus of the main parabolic reflector 2 is a multiple cell reflector 4. The multiple cell reflector comprises a plurality of reflector cells 5; each cell may have a positive or negative curvature and is in essence a small replica of the main parabolic reflector 2.

Located outside the test chamber structure 1 in coaxial relation with the relay lens 3 and multiple cell reflector 4 is a radiation source 6. The radiation source 6 includes a radiation element 7. The radiation element 7 is a light source, that is, emanates radiation in the visible spectrum as well as in the infrared and ultraviolet regions. Ideally, the radiation source is matched as closely as possible to the solar radiations present in outer space. The radiation element is placed between a spherical reflector 8 and an elliptical reflector 9 so that a converging beam 10 forms a second focus at the relay lens 3. That is, assuming the radiation element 7 to be essentially spherical and having a diameter of $C_1$, a real image of the diameter $C_2$ will be formed at the relay lens 3 in accordance with the following formula:

$$C_2 = C_1 \frac{f_1 + f_2}{f_1}$$

where:

$f_1$ is the first focal length; that is, the distance between the radiation element and the elliptical mirror, and
$f_2$ is the second focal length; that is, the distance between the radiation element and the center of the relay lens.

The size of the image $C_2$ of the light or radiation source determines the minimum size of the relay lens 3.

A diverging beam 11 continues from the relay lens 3 and its cross-sectional area at the level of the multiple cell reflector 4 coincides with the area of the multiple cell reflector. In other words, the diameter $L_1$ of the multiple cell reflector 4 is equal to the diameter of the image of the radiation source 6 having a diameter L. Stated mathematically, the following are the equations which must be satisfied:

$$(f_2 - f)(F - f) = f_2$$

and $$\frac{L}{L_3} = \frac{f_2}{F}$$

As stated previously, each reflector cell 5 is a small replica of the main mirror 2. That is, the curvature of each cell is such that the reflected beam 12 therefrom encompasses the entire area of the main parabolic reflector 2. Inasmuch as the beam 12 from each cell covers the entire area of the main reflector 2, the radiation received at any point of the main reflector is the sum of the radiation reflected from all of the cells 5.

This is of primary importance, for the radiation received tends to be uniform throughout the main reflector without small areas of high intensity or areas of low intensity. By reason of the fact that the main reflector is parabolic in shape and that the multiple cell reflector 4 is located essentially at the focal point of the main reflector, the final radiation beam from the main reflector comprises parallel rays. Actually, because the multiple cell reflector is not a mathematical point source, the rays of the finally reflected beam are not truly parallel but are sufficiently so that for all practical purposes the radiation intensity is uniform in the test region of the test chamber structure at some distance below the multiple cell reflector 4.

The multiple cell reflector does, of course, produce a shadow, but if this reflector is small compared to the main reflector 2, this is not of serious consequence. Furthermore, such a shadow may be avoided entirely by a more sophisticated system which will be described hereinafter.

Reference is now directed to FIGURES 2 and 3. In this arrangement the test chamber structure main reflector 2, relay lens 3 and multiple cell reflector 4 are identical to the previously described structure. In place of a single radiation source 6, a plurality of radiation sources are provided. The radiation sources may be arranged in small units or groups 13. For example, groups of seven radiation sources 6 with the groups of radiation sources are arranged in a circle defining a plane at right angles to the axis of the relay lens 3. Each group or unit 13 of radiation sources forms a radially inwardly converging beam 14 which is directed substantially axially with respect to the relay lens 3 by a panel reflector 15 of a multiple panel reflector structure 16 located immediately above the relay lens 3.

With this arrangement the radiation intensity which may be passed through the relay lens to the multiple cell reflector 4 and main reflector 2 is greatly increased. The diverging beams 17 from the ring of radiation source groups or units 13 are superimposed on the multiple cell reflector 4; that is, in so far as this reflector is concerned, it "sees" the radiation from all of the radiation sources as coming from a single location coinciding essentially with the single location of the radiation source 6 shown in FIGURE 1.

With this arrangement of the optical or radiation transmission system, variations in ray intensity are averaged out twice; that is, variations in ray intensity from the various sources tend to be eliminated as the beams from each of the radiation sources groups 13 cover the entire area of the multiple cell reflector. Stated otherwise, each point of the multiple cell reflector receives the sum of the radiation from all of the groups of radiation sources. In turn, each cell 5 distributes its reflected beam over the entire area of the main reflector 2.

Figure 9:
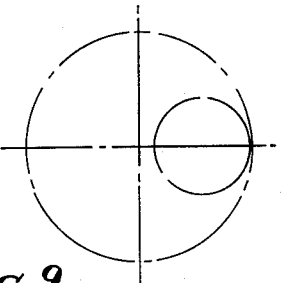
FIGURE 9 is a diagrammatical view illustrating the portion of a symmetrical parabola from which the main reflector shown in FIGURES 4, 6 and 7 and the cells of the multiple reflector shown in FIGURES 4 and 5 are taken.

Reference is now directed to FIGURES 4 and 5. The arrangement here illustrated differs from the previously described systems by placing the relay lens and multiple cell reflector at one side of the test chamber structure. This may be done by constructing the main reflector 18 so that it is an eccentric segment of a symmetrical parabolic figure; that is, the main reflector may be represented by the solid circle shown in FIGURE 9 offset from the axis of a symmetrical parabolic figure represented by the broken circle shown therein.

The arrangement shown in FIGURES 4 and 5 utilizes a multiple cell reflector 19, the individual cells 20 of which are also eccentric segments of a parabola; that is, miniature replicas of the main reflector 18.

In the construction shown in FIGURES 1 through 3, a single relay lens 3 is illustrated. It should be understood, however, that a group of lenses may be substituted for the single lens. For purposes of illustration, a group of multiple lenses 21 is shown in FIGURE 4. The individual lenses may be in one-to-one correspondence with flat panel reflectors 15 of one or more multiple panel reflector structures 16 which redirect radiation beams from one or more rings of radiation sources such as radiation sources 13 shown in FIGURE 3.

The arrangements shown in FIGURES 4 and 5 retain the advantages of the arrangement shown in FIGURE 3 in that the radiation received by the main reflector 18 tends to be uniformly distributed thereover and the main reflector in turn produces a beam the rays of which tend to be parallel, or nearly so. Inasmuch as the multiple cell reflector is located at one side of the test chamber it does not cast a shadow in the work area below.

Figure 8:
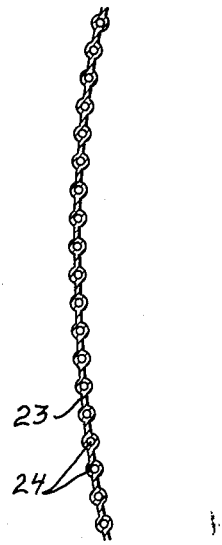
FIGURE 8 is a fragmentary sectional view taken through 8—8 of FIGURE 7.
Figure 7:
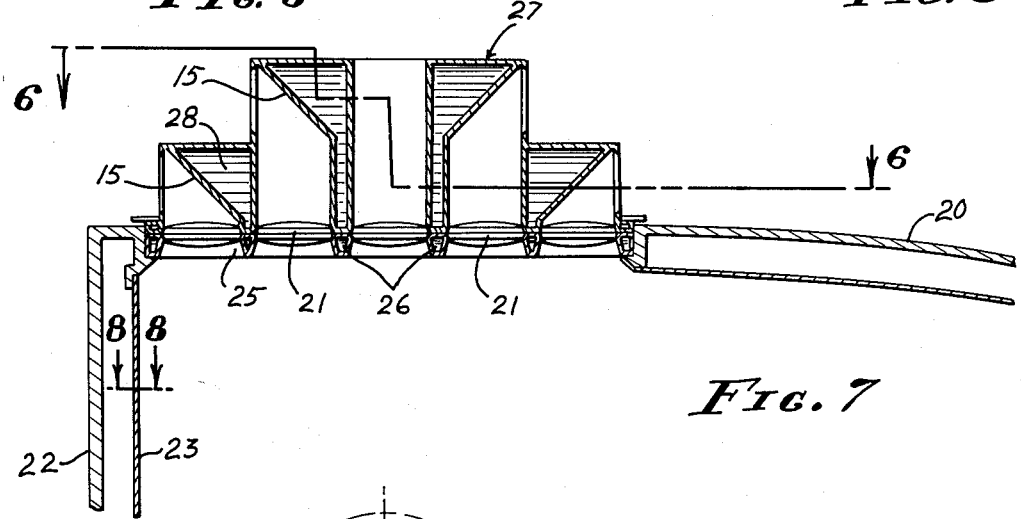
FIGURE 7 is a fragmentary sectional view taken through 7—7 of FIGURE 6.

Reference is now directed to FIGURES 6, 7 and 8, which illustrate in more detail but still in substantially diagrammatical form the arrangement shown in FIGURE 4. The test chamber structure 1 includes an outer shell 22 of sufficient strength to permit the existence of a high vacuum within the test chamber structure. Mounted within the outer shell 22 is a curtain liner 23 which does not seal the outer shell from the interior of the test chamber but is provided with perforations or openings, not shown, so that the vacuum pressure exists on both sides of the curtain liner. The confronting surfaces of the curtain liner and outer shell are reflecting surfaces to minimize heat transfer into the test chamber. In addition, the curtain liner is provided with a multiplicity of coolant passages 24 through which liquid hydrogen or liquid helium is circulated for the purpose of reducing the temperature within the test chamber to temperatures approaching absolute zero. The main reflector 18 may be in the nature of a curtain liner spaced from the outer shell of the test chamber structure.

The lenses 21 are mounted in a supporting frame 25, suitably sealed in an aperture provided at one end of the test chamber structure. The supporting frame structure may be provided with a labyrinth of cooling passages 26. Supported on the frame 25 above the lenses 21 is a multiple panel housing 27 to which the panel reflectors 15 are attached or formed integrally therewith. The regions behind the panel reflectors are enclosed to form coolant chambers 28. The multiple cell reflector may also be provided with coolant passages, not shown. In addition, the various radiation sources may be equipped with conventional cooling means.

While what hereinbefore has been described as the preferred embodiment of this invention, it is readily apparent that alterations and modifications may be resorted to without departing from the scope of this invention and such alterations and modifications are intended to be included within the scope of the appended claims.

We claim:

1. A space simulator, comprising: a shell structure defining a test chamber; a source of solar simulating radiations disposed externally of said shell; a lens in a wall of said shell for transmitting said radiations as an expanding beam into said test chamber; a multiple cell reflector within said shell dimensioned to intersect the entire beam of said radiations; a main reflector at one end of said test chamber and arranged to receive radiations transmitted by said multiple cell reflector; each of the cells of said multiple cell reflector being parabolic so as to reflect that portion of the total radiation which it receives over essentially the entire surface of said main reflector, whereby each point of the main reflector receives the sum of the radiations from all the cells of said multiple cell reflector.

2. A space simulator as set forth in claim 1 wherein: said source of solar simulating radiations is disposed in coaxial relation with said lens.

3. A space simulator as set forth in claim 1 wherein: a plurality of sources of solar simulating radiations are arranged in at least one circle about the axis of said lens and a multiple panel reflector is positioned to direct the radiations from said sources through said lens.

4. A space simulator as set forth in claim 1 wherein: said main reflector and each cell of said multiple cell reflector is an eccentric segment of a parabola; and said lens and said multiple cell reflector are disposed at one side of said main reflector.

5. A space simulator as set forth in claim 1 wherein: a plurality of sources of solar simulating radiations are arranged in at least one circle about the axis of said lens;

a multiple panel reflector is positioned to direct the radiations from said sources through said lens; said main reflector and each cell of said multiple cell reflector is an eccentric segment of a parabola; and said lens and said multiple cell reflector are disposed at one side of said main reflector.

6. A space simulator as set forth in claim 1 wherein: said lens is divided into a plurality of lens units and the radiations passing each lens are distributed over the entire multiple cell reflector.

7. A space simulator, comprising: a shell structure defining a test chamber; at least one source of solar simulating radiations including a radiating element, a spherical reflector and an elliptical reflector to focus said radiations into a converging beam; at least one lens forming a window in a wall of said shell for transmitting said radiations as an expanding beam into said test chamber; a multiple cell parabolic reflector within said shell and intersecting said beam and arranged to receive essentially the entire image of said radiation source; a main parabolic reflector at one end of said test chamber and so related to said multiple cell reflector as to receive radiations reflected from said multiple cell reflector and direct said radiations in a parallel beam across said test chamber; each of the cells of said multiple cell reflector being arranged to reflect that portion of the radiations falling thereon onto essentially the entire surface of said main reflector whereby each point on said main reflector receives radiation from all of said cells.

8. A space simulator as set forth in claim 7 wherein: said source of solar simulating radiations is disposed in coaxial relation with said lens.

9. A space simulator as set forth in claim 7 wherein: a plurality of sources of solar simulating radiations are arranged in at least one circle about the axis of said lens; and a multiple panel reflector is positioned to direct the radiations from said sources through said lens.

10. A space simulator as set forth in claim 7 wherein: said main reflector and each cell of said multiple cell reflector is an eccentric segment of a parabola; and said lens and said multiple cell reflector are disposed at one side of said main reflector.

11. A space simulator as set forth in claim 7 wherein: a plurality of sources of solar simulating radiations are arranged in at least one circle about the axis of said lens; a multiple panel reflector is positioned to direct the radiations from said sources through said lens; said main reflector and each cell of said multiple cell reflector is an eccentric segment of a parabola; and said lens and said multiple cell reflector are disposed at one side of said main reflector.

12. A space simulator as set forth in claim 7 wherein: said lens is divided into a plurality of lens units and the radiations passing each lens are distributed over the entire multiple cell reflector.

References Cited by the Examiner
UNITED STATES PATENTS

| | | | |
|---|---|---|---|
| 2,755,374 | 7/56 | Ott et al. | 240—41.1 X |
| 3,064,364 | 11/62 | Schueller | 73—432 |

RICHARD C. QUEISSER, *Primary Examiner.*

DAVID SCHONBERG, *Examiner.*